(12) United States Patent
Peng et al.

(10) Patent No.: US 9,863,816 B2
(45) Date of Patent: Jan. 9, 2018

(54) MEASUREMENT CIRCUIT

(71) Applicant: KRIWAN Industrie-Elektronik GmbH, Forchtenberg (DE)

(72) Inventors: Xiaoming Peng, Öhringen (DE); Ulf Kretschmer, Öhringen (DE)

(73) Assignee: KRIWAN Industrie-Elektronik GmbH, Forchtenberg (DE)

( * ) Notice: Subject to any disclaimer, the term of this patent is extended or adjusted under 35 U.S.C. 154(b) by 320 days.

(21) Appl. No.: 14/718,169

(22) Filed: May 21, 2015

(65) Prior Publication Data
US 2015/0338284 A1   Nov. 26, 2015

(30) Foreign Application Priority Data

May 21, 2014 (DE) .................. 10 2014 107 170

(51) Int. Cl.
| G01K 7/18 | (2006.01) |
| G01K 7/16 | (2006.01) |
| G01K 13/00 | (2006.01) |
| H02P 3/06 | (2006.01) |
| G01K 3/00 | (2006.01) |
| G01K 7/22 | (2006.01) |
| H02K 11/25 | (2016.01) |

(52) U.S. Cl.
CPC ............... *G01K 7/16* (2013.01); *G01K 3/005* (2013.01); *G01K 7/18* (2013.01); *G01K 7/22* (2013.01); *G01K 13/00* (2013.01); *H02K 11/25* (2016.01); *H02P 3/06* (2013.01)

(58) Field of Classification Search
CPC ............ G01K 7/02; G01K 7/22; G01K 13/02; G01K 2205/04; G01K 2013/024; G01K 7/10; G01K 11/32; G01K 13/00; G01K 7/42; G01K 3/02; G01K 3/10; H01R 4/023; H01R 4/029; H01R 43/28; B23K 31/02; H02M 1/32; H02M 1/38; H02M 1/53806; G01J 5/004; G01J 5/043; G01J 5/048; G01J 5/042; G01J 5/0821; F24F 11/0012; F24F 2001/0052; F24F 2011/0093; F24F 11/022; B22D 2/006; G01F 1/00; G01N 25/72; H05K 7/20945; H01C 7/008; H01C 17/00; G01R 31/2642; G01R 31/048; G01R 31/40

See application file for complete search history.

(56) References Cited

U.S. PATENT DOCUMENTS

| 6,717,457 | B2 | 4/2004 | Nanba | |
| 2003/0067344 | A1* | 4/2003 | Nanba | G01K 7/24 374/E7.031 |

FOREIGN PATENT DOCUMENTS

| DE | 15 73 167 A | 5/1970 |
| DE | 24 55 588 A1 | 5/1976 |
| DE | 195 40 625 A1 | 5/1997 |
| DE | 198 22 056 A1 | 11/1999 |
| DE | 29 823 817 U1 | 1/2000 |
| EP | 2 187 494 B1 | 8/2012 |

* cited by examiner

*Primary Examiner* — Manish S Shah
(74) *Attorney, Agent, or Firm* — Renner Kenner Greive Bobak Taylor & Weber

(57) ABSTRACT

A measurement circuit according to the invention for temperature monitoring has a quantitative temperature sensor and at least one qualitative temperature sensor, the quantitative temperature sensor and the at least one qualitative temperature sensor being connected in series, the quantitative temperature sensor having a consistent characteristic line which increases in a strictly monotonous manner or a consistent characteristic line which decreases in a strictly monotonous manner and being dedicated to the precise temperature measurement, and the qualitative temperature sensor having a nominal response temperature at which the resistance value changes in a non-linear manner and being dedicated to the monitoring of limit temperatures.

8 Claims, 2 Drawing Sheets

MEASUREMENT CIRCUIT

CROSS-REFERENCE TO RELATED APPLICATIONS

This application claims the benefit of German Patent Application No. 10 2014 107 170.0, filed May 21, 2014, and incorporated herein by reference.

TECHNICAL FIELD

The invention relates to a measurement circuit for temperature monitoring and a protection device for temperature monitoring having such a measurement circuit.

BACKGROUND OF THE INVENTION

Electric motors are subject to the risk of the motor winding overheating, overloads, poor network qualities (low voltage/excess voltage), impaired cooling, a blocked rotor, and the like, being among the most frequent causes of malfunction. Motors, in particular refrigeration compressor motors which are heavily used and are therefore subjected to a forced cooling operation, must be protected from such risks.

DE 198 22 056 A1 discloses a temperature protection circuit for protecting electrical devices having a series connection of PTC thermistors having stepped nominal response temperatures. The characteristic line of PTC thermistors is relatively flat from ambient temperature to a few degrees Celsius below the nominal response temperature NAT and then increases exponentially. A statement relating to the winding temperature is not possible with such PTC thermistors. However, the change of the resistance value in the range of the nominal response temperature NAT can be detected by an evaluation device of an actuation device. The switching-off operation of the motor is initiated when the evaluation device has determined that the nominal response temperature NAT has been exceeded.

Although PTC sensors are very small, as a result of the thermal transition resistances between the sensor and the winding, they can follow the very rapid temperature increase only in a delayed manner. In the case of refrigeration compressor motors with winding current densities up to 80 A/mm$^2$, in the event of a short-circuit the temperatures increase at 25-30 K/s. This means that delays of a few seconds in switching off can already produce a very high temperature overshoot. The switching-off is carried out only when the temperature detected has reached the nominal response temperature. At this time, however, the actual winding temperature is already substantially over the pre-determined threshold value.

EP 2 187 494 B1 therefore proposes a protection device for electric motors having a sensor circuit having at least a first PTC sensor and at least a second PTC sensor, the nominal response temperatures having different magnitudes. The two PTC sensors are connected to each other in such a manner that the total resistance of the sensor circuit has a characteristic line which in each case provides for an inflection point in the range of the nominal response temperatures. With such a characteristic line, the reaching of a critical situation can be detected even more rapidly.

Although PTC thermistors have been found to be effective as protection against excess temperature, there are applications in which they are disadvantageous. This is particularly the case when an unusually rapid temperature increase occurs. In this instance, a conventional actuation when the nominal response temperature is exceeded would lead to a large temperature overshoot which could have dangerous consequences.

Furthermore, each safety shutdown operation represents a loss of the availability of the installation and can consequently have significant consequences. In the case of highly loaded motors in which the availability of the installation which is operated thereby is very important, it is desirable, when an alarming temperature range is reached, to introduce further measures in order to prevent a further temperature increase in order to prevent a safety shutdown operation when the nominal response temperature is reached. To this end, corresponding proposals are set out in DE 10 2005 052 042. However, the implementation of this additional function generally requires the use of additional measurement channels or devices.

DE 602 05 697 T2 relates to a semi-conductor device having a temperature change detector and a temperature corrector, sense resistors of a type A and sense resistors of a type B being used, the sense resistors of the type A having a positive temperature coefficient and a linearly increasing resistance value and the sense resistors of the type B being characterised by a non-linear resistance line which gradually decreases with the temperature. A precise temperature measurement is neither provided nor conceivable with this temperature change detector.

SUMMARY OF THE INVENTION

An object of the invention is therefore to provide a measurement circuit for temperature monitoring which is simple to produce and which, in addition to the qualitative limit value monitoring, also enables precise temperature detection.

This object is achieved according to the invention with the features of claim 1. Additional embodiments of the invention are set out in the additional claims.

The measurement circuit according to the invention for temperature monitoring has one quantitative temperature sensor and at least one qualitative temperature sensor,
  the quantitative temperature sensor and the at least one qualitative temperature sensor being connected in series, and
  the quantitative temperature sensor having a consistent characteristic line which increases in a strictly monotonous manner or a consistent characteristic line which decreases in a strictly monotonous manner and being dedicated to the precise temperature measurement, and
  the qualitative temperature sensor having a nominal response temperature at which the resistance value changes in a non-linear manner and being dedicated to the monitoring of limit temperatures.

Furthermore, a protection device for electric motors having such a measurement circuit is provided. The protection device further has an actuation device having an evaluation device in order to evaluate the measurement signal which is produced as a result of the total resistance of the measurement circuit and to produce an output signal for the actuation device in accordance with the measurement signal. The function and operating method of the actuation device is generally known. In this regard, reference is further made to EP 2 187 494 B1.

A qualitative temperature sensor is intended to be understood to be a sensor which can detect at a monitoring location whether the temperature is above or below a specific limit value. Such sensors have a significantly non-linear, often abrupt change around a specific temperature (nominal response temperature). A quantitative sensor in the context of the invention is intended to be understood to be a sensor which is suitable for detecting a precise temperature at a monitoring location. Such sensors have a consistent characteristic line which increases in a strictly monotonous manner or decreases in a strictly monotonous manner.

Both the quantitative temperature sensor and the qualitative temperature sensor are preferably resistance thermometers, in particular passive resistance thermometers, preferably having positive temperature coefficients.

As a result of the measurement circuit according to the invention, flexible monitoring by means of a single measurement channel is possible. The qualitative temperature sensor which is formed, for example, by a PTC thermistor, in this instance performs the primary task of qualitative limit value monitoring by means of the nominal response temperature (NAT) thereof, at which the resistance value of the sensor increases exponentially. The quantitative temperature sensor which is formed, for example, by a PT1000 or a KTY silicon measurement resistor, performs the secondary function of precise temperature detection for additional, temperature-dependent functional applications.

PTC thermistors have the advantage that they have a standardised characteristic line. The nominal response temperature of the measurement circuit is defined by means of the sensor with the temperature thereof and not by the actuation device. Therefore, any tolerance in the electronic evaluation unit is of almost no significance. Furthermore, the thermal inertia between the location to be monitored and the sensor output is powerfully compensated for by the characteristic line which increases exponentially around the nominal response temperature.

According to another embodiment of the invention, there is provision for two or more qualitative temperature sensors to be connected in series. This enables the positioning of the two or more qualitative temperature sensors at different measurement locations so that the temperatures at different measurement locations can be monitored by means of one measurement channel.

According to a preferred embodiment of the invention, the at least one qualitative temperature sensor is formed by at least one thermistor which has a flat resistance path below a nominal response temperature, the quantitative temperature sensor below the nominal response temperature having a resistance path which has a larger change which is preferably at least twice as large as the flat resistance path of the qualitative temperature sensor. As a result of the quantitative temperature sensor, in a measurement range below the nominal response temperature, an additional measurement range is provided by a precise temperature detection being possible.

It is possible to use as a quantitative temperature sensor any desirable temperature-dependent measurement resistor which, in the total measurement range to be defined, has a (substantially) smaller resistance value than the resistance value of the qualitative sensor at the nominal response temperature.

In addition to the monitoring of electric motors, the measurement circuit according to the invention can also be used for other applications, for example, for hot gas temperature monitoring for coolant compressors.

Other advantages and embodiments of the invention are explained in greater detail with reference to the following description and the drawings.

DETAILED DESCRIPTION OF ILLUSTRATIVE EMBODIMENTS

Figure 1:
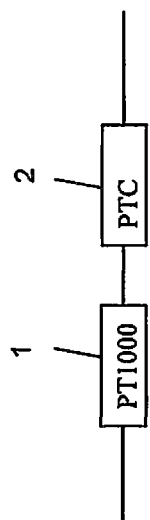
FIG. 1 is a circuit diagram of a measurement circuit having a quantitative temperature sensor and a qualitative temperature sensor.

FIG. 1 shows a measurement circuit having a quantitative temperature sensor 1 and a qualitative temperature sensor 2 which are connected in series. The quantitative temperature sensor 1 is in this embodiment formed by a PT1000 and the qualitative temperature sensor 2 is formed by a PTC thermistor.

Figure 2:
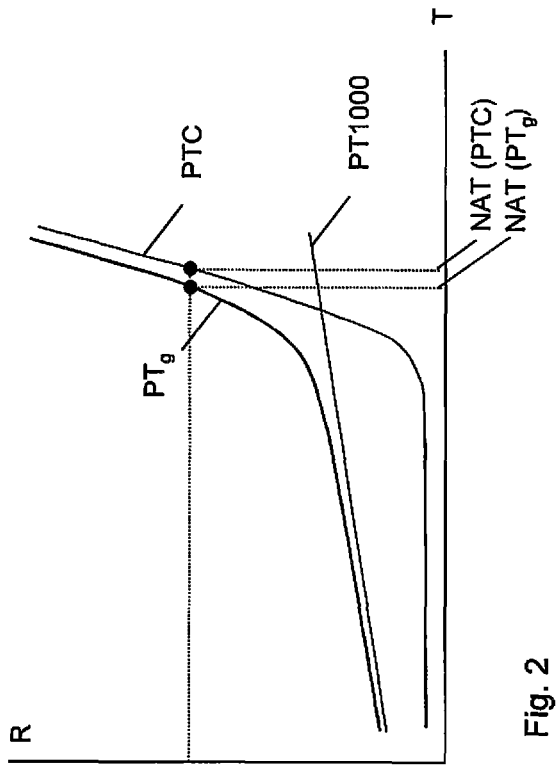
FIG. 2 is a temperature/resistance graph of the embodiment according to FIG. 1.

In the temperature/resistance graphs of FIG. 2, the total characteristic line $PT_g$ of the measurement circuit is produced as a sum of the resistances of the two temperature sensors 1, 2:

$$PT_g = PTC + PT1000 \tag{1}$$

The nominal response temperature $NAT(PT_g)$ of the total characteristic line deviates as a result of the steep exponential increase of the PTC characteristic line in this range only minimally from the nominal response temperature NAT (PCT) of the PTC characteristic line and is within the production-related tolerance range. The nominal response temperature $NAT(PT_g)$ of the total characteristic line can consequently be considered to be that of the PTC thermistor and is therefore compatible with conventional actuation devices.

In the total flat region of the resistance path of the PTC characteristic line, the total characteristic line $PT_g$ can be approximated as follows:

$$PT_g = PTC_{25°C} + PT1000 \tag{2}$$

where $PTC_{25°C}$ is the PCT resistance value at 25° C.

Consequently, the temperature can be clearly associated with the measured resistance value $PT_g$ in the total flat region of the PTC characteristic line using the equation (2) and the PT1000 characteristic line of the quantitative sensor 1 used. Secondary temperature-dependent applications, such as the monitoring of an additional temperature value or the analysis of the temperature behaviour or the time changes can then be implemented in a flexible manner in addition to the primary NAT monitoring.

Figure 3:
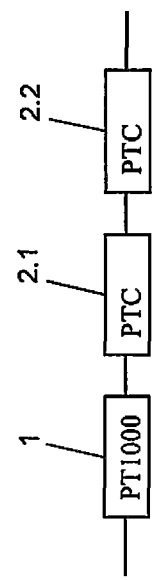
FIG. 3 is a circuit diagram of a measurement circuit having a quantitative temperature sensor and two qualitative temperature sensors.

In a corresponding manner, it is also possible to provide a plurality of qualitative temperature sensors 2 with identical or individual nominal response temperatures which are arranged at different monitoring locations. FIG. 3 shows such an embodiment having 2 PTC thermistors. In this instance, the decisive aspect is that only a single quantitative sensor 1 is used for a selected monitoring location. The temperature evaluation for the selected monitoring location is carried out by means of the approximation formula (3), as long as none of the monitoring locations has reached its nominal response temperature which is individually defined by the qualitative sensor 2:

$$PT_g = \sum_{1}^{n} PTC_{25°\,C.} + PT1000 \qquad (3)$$

where n is the number of PTC thermistors.

Figure 4:
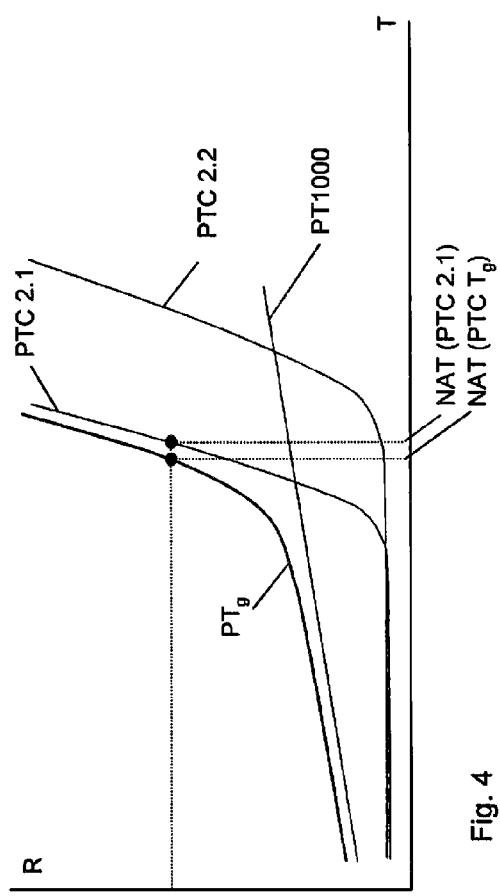
FIG. 4 is a temperature/resistance graph of the embodiment according to FIG. 3 in the event that the PTC thermistor PCT2.1 of a first measurement location responds at the nominal response temperature thereof prior to the PTC thermistor PTC2.2 of a second measurement location.

FIG. 4 shows the temperature/resistance graph of the embodiment according to FIG. 3 in the event that the temperature at a first monitoring location at which the PTC thermistor PCT2.1 is arranged has reached the nominal response temperature, whilst the temperature at the second monitoring location at which the PTC thermistor PCT2.2 is arranged is still below the nominal response temperature. The evaluation is then similar to FIG. 2.

Figure 5:
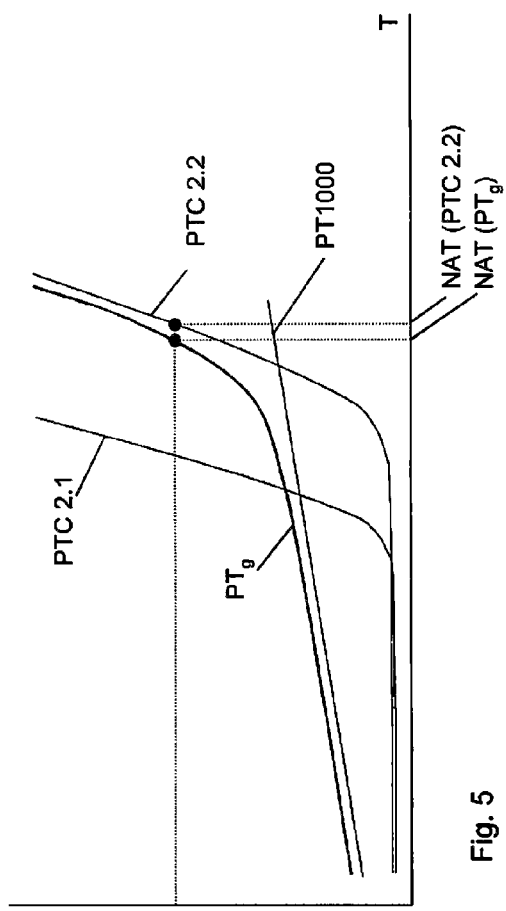
FIG. 5 is a temperature/resistance graph of the embodiment according to FIG. 3 in the event that the PTC thermistor PCT2.2 at the second measurement location responds prior to the PTC thermistor PCT2.1 at the first measurement location.

FIG. 5 shows the temperature/resistance graph of the embodiment according to FIG. 3 in the event that the temperature at the second monitoring location at which the PTC thermistor PCT2.2 is arranged reaches the nominal response temperature first. The evaluation is then again similar to FIG. 2.

The invention claimed is:

1. A measurement circuit for precise temperature measurement and for qualitative limit value monitoring having one quantitative temperature sensor and at least one qualitative temperature sensor, characterised in that
   the quantitative temperature sensor and the at least one qualitative temperature sensor are connected in series,
   the quantitative temperature sensor for precise temperature measurement is formed as a resistance thermometer having positive temperature coefficients and has a consistent characteristic line which increases in a strictly monotonous manner, and
   the qualitative temperature sensor for qualitative limit value monitoring is formed as a resistance thermometer having positive temperature coefficients and has a nominal response temperature (NAT) at which the resistance value of the qualitative temperature sensor changes in a non-linear manner.

2. The measurement circuit according to claim 1, characterised in that the at least one qualitative temperature sensor has a nominal response temperature (NAT) at which the resistance value of the qualitative temperature sensor increases exponentially.

3. The measurement circuit according to claim 1, characterised in that two or more qualitative temperature sensors are connected in series.

4. The measurement circuit according to claim 1, characterised in that the two or more qualitative temperature sensors are arranged at different measurement locations.

5. The measurement circuit according to claim 1, characterised in that the at least one qualitative temperature sensor is formed by at least one thermistor which has a flat resistance path below the nominal response temperature (NAT), the quantitative temperature sensor below the nominal response temperature having a resistance path which has a larger change compared with the flat resistance path of the qualitative temperature sensor.

6. The measurement circuit according to claim 1, characterised in that the quantitative temperature sensor below the nominal response temperature (NAT) has a resistance path which has a change which is at least twice as large as the flat resistance path of the qualitative temperature sensor.

7. The measurement circuit according to claim 1, characterised in that the quantitative temperature sensor in the entire measurement range thereof has a smaller resistance value than the resistance value of the qualitative temperature sensor at the nominal response temperature.

8. A protection device for temperature monitoring having a measurement circuit according to claim 1.

* * * * *